United States Patent [19]

Kim

[11] 4,042,542
[45] Aug. 16, 1977

[54] PROCESS FOR REMOVING POLYMER FROM REACTION MIXTURE

[75] Inventor: Ki Soo Kim, Irvington, N.Y.

[73] Assignee: Stauffer Chemical Company, Westport, Conn.

[21] Appl. No.: 613,143

[22] Filed: Sept. 15, 1975

[51] Int. Cl.$^2$ ............................................. C08L 89/00
[52] U.S. Cl. ........................................ 260/6; 260/13; 260/47 P; 260/49
[58] Field of Search ................. 260/6, 13, 14, 37 R, 260/47 P, 49; 526/491

[56] References Cited

U.S. PATENT DOCUMENTS

| | | | |
|---|---|---|---|
| 2,572,076 | 10/1951 | Toy | 260/47 P |
| 2,636,876 | 4/1953 | Zenftman et al. | 260/47 P |
| 2,716,100 | 8/1955 | Coover et al. | 260/47 P |
| 3,058,971 | 10/1962 | Miller et al. | 528/495 |
| 3,541,062 | 11/1970 | Dierendonck | 528/494 |
| 3,828,012 | 8/1974 | Arndt et al. | 528/491 |
| 3,830,883 | 8/1974 | Sturt | 528/491 |

*Primary Examiner*—Edward M. Woodberry
*Attorney, Agent, or Firm*—Richard P. Fennelly

[57] ABSTRACT

The recovery of a polymer product formed by condensing an organo-phosphonic acid dichloride or dibromide, a dihydroxy aromatic compound and, optionally, a crosslinking momomer in an organic solvent reaction medium, as a granular solid is accomplished by combining said organic solvent containing the polymer product and an aqueous solution which contains an effective amount of suspending agent to later induce precipitation of said polymer product and by thereafter agitating the solution while removing the solvent therefrom to affect precipitation of said granular polymer product.

8 Claims, No Drawings

PROCESS FOR REMOVING POLYMER FROM REACTION MIXTURE

TECHNICAL DESCRIPTION OF THE INVENTION

In applicant's copending U.S. application Ser. No. 613,144, filed Sept. 15, 1975, entitled "Process for Forming Polymers" a process is described for reacting organo-phosphonic acid dichlorides and dibromides with dihydroxy aromatic compounds, optionally in the presence of crosslinking monomers, at temperatures lower than conventionally used and without the use of the alkaline earth halide condensation catalysts used in various prior art procedures. Basically, the process involved the reaction of the desired monomers in an inert organic solvent, in which the intermediates and product are soluble, in the presence of an amine acid acceptor to remove hydrochloric acid by-product. Recovery of the product from the inert organic solvent using applicant's above-described procedure was often difficult involving a substantial loss of polymer product.

It has now been found that the product of the above-described reaction can be recovered as a granular solid in high yield and with substantially enhanced economy by combining the reaction mixture with an aqueous solution containing an effective amount of a suspending agent for later formation of the desired granular product of polymer and by thereafter subjecting the solution to agitation while removing substantially all the organic solvent from the solution. This latter step affects the actual precipitation of the polymer product from the solution.

The organo-phosphonic acid dihalides suitable for use as a first monomeric component in forming the reaction mixture which is to be used in the present process have the formula:

where R is a $C_1 - C_{12}$ alkyl group, a cycloalkyl group or a phenyl group and X is bromine or chlorine. A particularly preferred compound is benzene phosphorus oxydichloride. Others which may be used include those wherein X is either chlorine or bromine and R is selected from the group consisting of methyl, ethyl, propyl, iso-propyl, butyl, sec.-butyl, heptyl, decyl, dodecyl, cyclopentyl, and cyclohexyl. Mixtures of any of the foregoing dihalides can be utilized, if desired.

The dihydroxy aromatic compound which is used as the second reactant in forming the reaction mixture which is to be treated in accordance with the present invention can have any of the following characteristic structures:

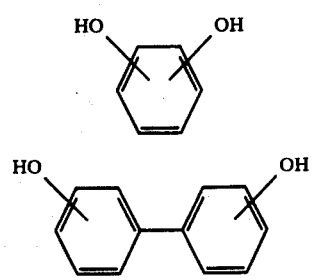

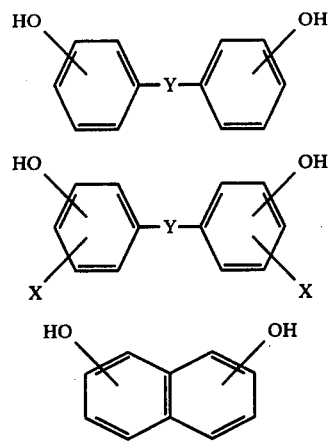

where Y is a sulfur atom, the group

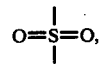

an alkylene group having from 1 to 6 carbon atoms, or a cycloalkylene group and X is halogen, preferably chlorine or bromine. The following representative compounds can be used: resorcinol, catechol, hydroquinone, the dihydroxytoluenes, the dihydroxy xylenes, 4,4'-dihydroxydiphenyl sulfone, 2,4'-dihydroxydiphenyl sulfone, 4,4'thiodiphenol, 2,4'-thiodiphenol, 3,3'-dimethyl-4,4'-dihydroxydiphenyl sulfone, 2,2'-dimethyl- 4,4'-dihydroxy-5,5'-di-t-butyldiphenyl sulfone, 2,2'-dihydroxy-3,3'-dimethyl sulfone, 3,3'-5,5'-tetra methyl-4,4'-dihydroxydiphenyl sulfone, 4,4'-dihydroxybiphenyl, 4,4'-methylenebisphenol, 4,4'-ethylidenebisphenol, 4,4'-isopropylidenebisphenol, 4,4'-cyclohexidenebisphenol, 2,2'-methylenebisphenol, 1,5, dihydroxynaphthalene, 2,7 -dihydroxynaphthalene, and the like. Mixtures of any of the foregoing can be used. It is particularly preferred to use at least 50% of either one of the foregoing sulfones, hydroquinone, resorcinol, or thiodiphenols.

If a crosslinked copolymer is desired in the basic reaction described above, the trifunctional phosphorus compounds described in U.S. Pat. No. 2,716,101 to Coover Jr. et al. can be used. Representative compounds are phosphorus oxychloride, triphenyl phosphate, tricresyl phosphate, diphenylchlorophosphate and phenyldichlorophosphate. Trihydroxyaromatic compounds, such as those in Thomas U.S. Pat. No. 3,326,852 can also be used. Some representative compounds are phloroglucinol (1, 3, 5-trihydroxybenzene), 2, 4, 6-trihydroxytoluene, 1, 4, 5-trihydroxynaphalene and the like. Others which are suitable for use are listed in U.S. Pat. No. 3,326,852.

If a non-crosslinked product is desired, the molar ratio of organo-phosphonic compound to dihydroxy aromatic compound can vary from about 0.7:1 to about 1:0.7. preferably about 1:1. If a crosslinked product is required, the above-described crosslinking monomers are utilized. A higher amount of crosslinker produces a final product which is more insoluble in organic solvents than one containing a lesser amount of crosslinker. In such three-component, crosslinked copolymers the molar ratio of organo-phosphonic compound to crosslinking monomer can vary from about 100:1 to about 1:100, preferably around 50:1 to 1:50. The molar ratio of dihydroxy compound to combined amounts of organo-phosphonic compound and crosslinking monomer can range from about 1:1.2 to about 1.8:1, preferably from about 1:1 to about 1.5:1. It is most preferred that the reactants are proportioned so that the molar amounts of chlorine and bromine containing reactants equals the molar amounts of hydroxy containing reactants.

The basic reaction is carrid out in a suitable inert organic solvent in which both intermediate and the desired product are soluble. A preferred class of solvents are the chlorinated hydrocarbon solvents including methylene chloride, chloroform, dichloroethane, and the like.

An amine acid acceptor must be present in an amount sufficient to scavenge the hydrochloric acid or hydrobromic acid by-product produced during the reaction. The theoretical amount to use is about twice the molar amount of the main reactants, i.e., the organo-phosphonic compound and the dihydroxy compound. Generally from about 2 to 3 times the molar amount of acid acceptor based on the molar amount of the reactants is sufficient.

The trialkyl monoamines, the branched dialkyl monoamines, and the heterocyclic amines can be used in the present process. The alkyl group should be from one to eight carbon atoms in the above-described monoamines. Some representative acid acceptors are triethylamine, pyridine, diisopropylamine and the like. The trialkyl monoamines are preferred.

The present process is carried out at a much lower temperature than certain of the above-described prior art procedures. Generally temperatures of from about 0° to about 80° C. will give acceptable results. A more preferred temperature range is from about 15° to about 40° C. The reaction can easily be, and is preferably, run at room temperature.

When the reaction mixture formed by the above reaction has been obtained, it is combined, as previously described, with an aqueous solution containing the desired suspending agent. The weight ratio of reaction mixture to water solution containing the suspending agent can vary from about 1:1 to about 1:5. This combination of reaction mixture and suspension may be carried out at a temperature of from about 0° to about 30° C. It is preferably done at room temperature (20°-25° C.). Any of the conventional suspending agents normally used in the supension polymerization of polyvinyl chloride may be used. The amount of suspending agent which is present in the water should range from about 0.01 to about 1.0%, preferably about 0.05 to about 0.5%, by weight of the water. Examples of suitable suspending agents include methyl cellulose, hydroxyethyl cellulose, hydroxypropyl cellulose, carboxymethyl cellulose, talc, clay, polyvinyl alcohol, gelatine and the like. The reaction mixture may be added to the aqueous solution containing the suspending agent or vice-versa.

If desired, a small amount, e.g., frm about 0.01 to 1% by weight of the reaction mixture and aqueous solution, of an antifoam agent can also be added. This ingredient will inhibit the formation of bubbles in the mixture of the reaction mixture and aqueous solution when said mixture is agitated as the inert organic solvent is removed. Conventional antifoaming agents which can be used include the well-known silicones, organic phosphates and alcohols.

The mixture of aqueous solution containing the suspending agent and the reaction mixture containing the inert organic solvent are then agitated and the organic solvent is removed using known separation techniques, for example, distillation at either atmospheric or reduced pressure. Formation and precipitation of the desired polymer product in solid granular form occurs during this step of the process of the present invention.

The precipitated product is then removed by any of the separaton techniques that are used to recover a precipitate from the supernatant solution from which it came. Examples of such techniques include filtration, centrifugation, decantation and the like.

The following Examples illustrate certain preferred embodiments of the claimed invention.

EXAMPLE 1

This Example illustrates a preferred procedure for carrying out the process of the present invention.

A flask, fitted with a stirrer, dropping funnel and reflux condenser, was charged with 25.75 g. (0.103 mole) of sulfonyl diphenol, 22.2 g. (0.22 mole) of triethylamine and 350 ml. of methylene chloride. Benzene phosphorus oxydichloride, 19.5 g. (0.1 mole) and 0.31 g. (0.002 mole) of $POCl_3$ in 50 ml. of methylene chloride was slowly added at room temperature with stirring over a period of ½ hour. The stirring was continued for 1 hour at room temperature. The resulting reaction mixture was then washed with 300 ml. of 1N hydrochloric acid and with 300 ml. of water.

To the solution was then added 850 ml. of water containing 150 ml. of a 1% solution of Methocel suspending agent and 3 g. of an antifoaming agent. The polymer product precipitated as granules after removing the methylene chloride by distillation with stirring, the solution was filtered and the product residue was dried. The yield was 36 g. ( or 95% of the theoretical yield) of the condensation polymer of benzene phosphorus oxydichloride and 4,4'-sulfonyl diphenol.

EXAMPLE 2

This example illustrates another procedure for carrying out the process of this invention when the reactants used in Example 1 are reacted in an ethylene dichloride solvent, rather than methylene chloride as used in Example 1.

A flask, fitted with a stirrer, dropping funnel and reflux condenser, was charged with 25.75 g. (0.103 mole) of sulfonyl diphenol, 22.2 g. (0.22 mole) of triethylamine and 300 ml. of ethylene dichloride. Benzene phosphorus oxydichloride, 19.5 g. (0.1 mole) and 0.3 g. (about 0.002 mole) of $POCl_3$ in 50 ml. of ethylene dichloride was slowly added at room temerature with stirring over a period of ½ hour. The stirring was continued for 1 hour at room temperature. The resulting reaction mixture was then washed with 300 ml. of 1N hydrochloric acid and with 300 ml. of water.

To the solution was then added 550 ml. of water containing 150 ml. of a 1% solution of Methocel suspending agent and 4 g. of an antifoaming agent. The polymer product precipitated as granules after removing the ethylene dichloride by distillation with stirring, the solution was filtered and the product residue was dried. The yield was 38 g. (or 99% of the theoretical yield) of the condensation polymer of benzene phosphorus oxydichloride, 4,4'-sulfonyl diphenol and $POCl_3$.

The product had a melting point of 190°–195° C. an a relative viscosity of 1.43 as a 1% concentration of the polymer in a 60/40 weight mixture of phenol/tetrachloroethane at 25° C.

The foregoing is merely illustrative of certain preferred embodiments of the claimed invention. The appended claims set forth the scope of protection which is desired.

What is claimed is:

1. A process for removing a polymer formed by reacting an organo-phosphonic dichloride or dibromide, a dihydroxy aromatic compound, and, optionally, a crosslinking monomer in an inert organic solvent to form a reaction mixture of said inert solvent and said polymer product which comprises:
    a. combining said reaction mixture with an aqueous solution containing an effective amount of a suspending agent for later precipitation of said polymer product in granular form;
    b. removing said organic solvent from the mixture resulting from step (a) while said mixture is being agitated to thereby affect precipitation of the polymer product in solid granular form; and
    c. separating the precipitated polymer product and the supernatant formed thereby.

2. A process as claimed in claim 1 wherein the amount of suspending agent in said water solution is from about 0.01 to about 1%, by weight, of said water.

3. A process as claimed in claim 2 wherein the amount of suspending agent is from about 0.05 to about 0.5%.

4. A process as claimed in claim 1 wherein the suspending agent is selected from the group consisting of methyl cellulose, hydroxyethyl cellulose, hydroxypropyl cellulose, carboxymethyl cellulose, talc, clay, polyvinyl alcohol and gelatine.

5. A process as claimed in claim 1 wherein the weight ratio of reaction mixture to water solution containing the suspending agent is from about 1:1 to about 1:5.

6. A process as claimed in claims 1 wherein the combination of reaction mixture and water solution is carried out at a temperature of from about 0° to about 30° C.

7. A process as claimed in claim 6 wherein the temperature is from about 20° to about 25° C.

8. A process as claimed in claim 1 wherein the organic solvent is removed by distillation.

* * * * *